(12) United States Patent
Parlotto et al.

(10) Patent No.: US 11,120,462 B2
(45) Date of Patent: Sep. 14, 2021

(54) SYSTEMS AND METHODS FOR USING INDICIA OF MEMBERSHIP AS A PARTIAL AUTHORIZATION IN A TRANSACTION

(71) Applicants: Michael Parlotto, Atlanta, GA (US); David Vielehr, Eden Prairie, MN (US); Karl Denzer, Atlanta, GA (US); David Zygmont, Atlanta, GA (US)

(72) Inventors: Michael Parlotto, Atlanta, GA (US); David Vielehr, Eden Prairie, MN (US); Karl Denzer, Atlanta, GA (US); David Zygmont, Atlanta, GA (US)

(73) Assignee: E2INTERACTIVE, INC., Atlanta, GA (US)

( * ) Notice: Subject to any disclaimer, the term of this patent is extended or adjusted under 35 U.S.C. 154(b) by 431 days.

(21) Appl. No.: 14/933,992

(22) Filed: Nov. 5, 2015

(65) Prior Publication Data

US 2016/0055516 A1    Feb. 25, 2016

Related U.S. Application Data

(63) Continuation-in-part of application No. 14/070,800, filed on Nov. 4, 2013, now Pat. No. 10,062,075.

(51) Int. Cl.
*G06Q 30/02* (2012.01)
*G06Q 20/20* (2012.01)
*G06Q 20/34* (2012.01)

(52) U.S. Cl.
CPC ....... *G06Q 30/0226* (2013.01); *G06Q 20/204* (2013.01); *G06Q 20/3574* (2013.01); *G06Q 30/0238* (2013.01)

(58) Field of Classification Search
None
See application file for complete search history.

(56) References Cited

U.S. PATENT DOCUMENTS 3,288,350 A    11/1966    Kushner
5,091,634 A     2/1992    Finch et al.
(Continued)

FOREIGN PATENT DOCUMENTS

CN    102609839 A    7/2012
EP     2128809 A1   12/2009
(Continued)

*Primary Examiner* — Paul Danneman
(74) *Attorney, Agent, or Firm* — Landmark IP Law; Gregory Murphy

(57) ABSTRACT

In accordance with some embodiments of the present invention, aspects may include systems and methods of using a membership card to obtain benefits in a purchase transaction for goods or services. The method may include steps such as receiving at a central processor a communication from a point of sale including one or more identifiers of goods or services selected in the purchase transaction and information identifying the membership card, including at least a portion of the indicia; determining by the central processor potential benefits, if any, associated with the membership card; determining by the central processor if any potential benefits are applicable to the merchant, the point of sale, or the one or more goods or services identified by the received identifiers; determining a transaction benefit amount applicable to the transaction; and sending to the point of sale a partial authorization in the amount of the transaction benefit amount.

21 Claims, 6 Drawing Sheets

(56) References Cited

U.S. PATENT DOCUMENTS

| | | | |
|---|---|---|---|
| 5,602,377 A | 2/1997 | Beller et al. | |
| 5,708,780 A | 1/1998 | Levergood | |
| 5,729,693 A | 3/1998 | Holda-Fleck | |
| 5,740,915 A | 4/1998 | Williams | |
| 5,897,625 A | 4/1999 | Gustin | |
| 5,903,633 A | 5/1999 | Lorsch | |
| 6,085,242 A | 7/2000 | Chandra | |
| 6,304,860 B1 | 10/2001 | Martin, | |
| 6,315,193 B1 | 11/2001 | Hogan | |
| 6,317,028 B1 | 11/2001 | Valiulis | |
| 6,360,254 B1 | 3/2002 | Linden | |
| 6,418,414 B1 | 7/2002 | Lutz et al. | |
| 6,418,441 B1 | 7/2002 | Call | |
| 6,422,462 B1 | 7/2002 | Cohen | |
| 6,424,706 B1 | 7/2002 | Katz et al. | |
| 6,442,532 B1 | 8/2002 | Kawan | |
| 6,473,739 B1 | 10/2002 | Showghi et al. | |
| 6,507,823 B1 | 1/2003 | Nel | |
| 6,529,956 B1 | 3/2003 | Smith | |
| 6,536,659 B1 | 3/2003 | Hauser | |
| 6,648,222 B2 | 11/2003 | McDonald et al. | |
| 6,829,596 B1 | 12/2004 | Frazee | |
| 6,915,277 B1 | 7/2005 | Manchester et al. | |
| 6,965,866 B2 | 11/2005 | Klein | |
| 7,108,183 B1 | 9/2006 | Cox, Jr. | |
| 7,216,092 B1 | 5/2007 | Weber | |
| 7,434,729 B2 | 10/2008 | Cracchiolo et al. | |
| 7,494,417 B2 | 2/2009 | Walker | |
| 7,513,422 B1 | 4/2009 | Tucker | |
| 7,631,803 B2 | 12/2009 | Peyret et al. | |
| 7,702,542 B2 | 4/2010 | Aslanian | |
| 7,711,598 B2 | 5/2010 | Perkowski | |
| 7,757,944 B2 | 7/2010 | Cline et al. | |
| 7,848,948 B2 | 12/2010 | Perkowski et al. | |
| 7,904,333 B1 | 3/2011 | Perkowski | |
| 7,905,399 B2 | 3/2011 | Barnes et al. | |
| 8,103,520 B2 | 1/2012 | Mueller | |
| 8,181,867 B1 | 5/2012 | Bierbaum et al. | |
| 8,265,950 B2 | 9/2012 | Howe et al. | |
| 8,509,814 B1 | 8/2013 | Parker | |
| 8,577,735 B2 | 11/2013 | Wilen | |
| 8,636,203 B1 * | 1/2014 | Patterson | G06Q 20/401 235/379 |
| 8,751,298 B1 | 6/2014 | Giordano et al. | |
| 8,768,834 B2 | 7/2014 | Zacarias et al. | |
| 9,098,190 B2 | 8/2015 | Zhou | |
| 9,483,786 B2 | 11/2016 | Glass | |
| 9,672,687 B2 | 6/2017 | Cage | |
| 2001/0034609 A1 | 10/2001 | Dovolis | |
| 2001/0037264 A1 | 11/2001 | Husemann et al. | |
| 2001/0056410 A1 | 12/2001 | Ishigaki | |
| 2002/0010627 A1 | 1/2002 | Lerat | |
| 2002/0062249 A1 | 5/2002 | Iannacci | |
| 2002/0065713 A1 | 5/2002 | Awada et al. | |
| 2002/0070270 A1 | 6/2002 | Narita et al. | |
| 2002/0088855 A1 | 7/2002 | Hodes | |
| 2002/0091573 A1 | 7/2002 | Hodes | |
| 2002/0130176 A1 | 9/2002 | Suzuki | |
| 2002/0138573 A1 | 9/2002 | Saguy | |
| 2002/0153410 A1 | 10/2002 | Santini | |
| 2002/0198831 A1 | 12/2002 | Patricelli et al. | |
| 2003/0004802 A1 | 1/2003 | Callegari | |
| 2003/0009382 A1 | 1/2003 | D'Arbeloff | |
| 2003/0105688 A1 | 6/2003 | Brown et al. | |
| 2003/0121967 A1 | 7/2003 | Goldberg et al. | |
| 2003/0163787 A1 | 8/2003 | Hay et al. | |
| 2003/0197059 A1 | 10/2003 | Tidball et al. | |
| 2003/0234819 A1 | 12/2003 | Daly et al. | |
| 2004/0065726 A1 | 4/2004 | McGee et al. | |
| 2004/0117302 A1 | 6/2004 | Weichert et al. | |
| 2004/0185881 A1 | 9/2004 | Lee | |
| 2004/0193490 A1 | 9/2004 | Pletz | |
| 2004/0225560 A1 | 11/2004 | Lewis et al. | |
| 2004/0267663 A1 | 12/2004 | Karns | |
| 2005/0027624 A1 | 2/2005 | Cai | |
| 2005/0045732 A1 | 3/2005 | Whitaker | |
| 2005/0086168 A1 | 4/2005 | Alvarez | |
| 2005/0116028 A1 | 6/2005 | Cotten | |
| 2005/0182695 A1 | 8/2005 | Lubow et al. | |
| 2005/0261968 A1 | 11/2005 | Randall et al. | |
| 2006/0004631 A1 | 1/2006 | Roberts et al. | |
| 2006/0037835 A1 | 2/2006 | Doran | |
| 2006/0041470 A1 | 2/2006 | Filho et al. | |
| 2006/0053056 A1 * | 3/2006 | Alspach-Goss | G06Q 30/0215 705/14.17 |
| 2006/0089160 A1 | 4/2006 | Othmer | |
| 2006/0113376 A1 | 6/2006 | Reed et al. | |
| 2006/0253320 A1 | 11/2006 | Heywood | |
| 2007/0017975 A1 | 1/2007 | Lewis et al. | |
| 2007/0021969 A1 | 1/2007 | Homeier-Beals | |
| 2007/0030824 A1 | 2/2007 | Ribaudo | |
| 2007/0038577 A1 | 2/2007 | Werner | |
| 2007/0043682 A1 | 2/2007 | Drapkin et al. | |
| 2007/0055785 A1 | 3/2007 | Stevens | |
| 2007/0156436 A1 | 4/2007 | Fisher | |
| 2007/0125838 A1 | 6/2007 | Law et al. | |
| 2007/0136149 A1 | 6/2007 | Woodward et al. | |
| 2007/0162338 A1 | 7/2007 | Lawe | |
| 2007/0192182 A1 | 8/2007 | Monaco et al. | |
| 2007/0198433 A1 | 8/2007 | McGee et al. | |
| 2007/0251995 A1 | 11/2007 | Kingsborough et al. | |
| 2007/0265872 A1 | 11/2007 | Robinson et al. | |
| 2008/0028395 A1 | 1/2008 | Motta et al. | |
| 2008/0052169 A1 | 2/2008 | O'Shea et al. | |
| 2008/0059318 A1 | 3/2008 | Packes et al. | |
| 2008/0078831 A1 | 4/2008 | Johnson et al. | |
| 2008/0097851 A1 | 4/2008 | Bemmel et al. | |
| 2008/0133351 A1 | 6/2008 | White et al. | |
| 2008/0179395 A1 | 7/2008 | Dixon et al. | |
| 2008/0255942 A1 | 10/2008 | Craft | |
| 2008/0319868 A1 | 12/2008 | Briscoe | |
| 2009/0037326 A1 | 2/2009 | Chitti et al. | |
| 2009/0076896 A1 | 3/2009 | Dewitt | |
| 2009/0078755 A1 | 3/2009 | Sullivan et al. | |
| 2009/0094126 A1 | 4/2009 | Killian et al. | |
| 2009/0111378 A1 | 4/2009 | Sheynman | |
| 2009/0112709 A1 | 4/2009 | Barhydt et al. | |
| 2009/0144161 A1 | 6/2009 | Fisher | |
| 2009/0157487 A1 | 6/2009 | Cottrell et al. | |
| 2009/0164329 A1 | 6/2009 | Bishop et al. | |
| 2009/0171739 A1 | 7/2009 | De et al. | |
| 2009/0187491 A1 | 7/2009 | Bull | |
| 2009/0192904 A1 | 7/2009 | Patterson et al. | |
| 2009/0192928 A1 | 7/2009 | Abifaker | |
| 2009/0247131 A1 | 10/2009 | Champion | |
| 2009/0281941 A1 | 11/2009 | Worth | |
| 2009/0287558 A1 | 11/2009 | Seth et al. | |
| 2009/0298427 A1 | 12/2009 | Wilkinson | |
| 2010/0010906 A1 | 1/2010 | Grecia | |
| 2010/0041368 A1 | 2/2010 | Kumar | |
| 2010/0082490 A1 | 4/2010 | Rosenblatt | |
| 2010/0088188 A1 | 4/2010 | Kumar et al. | |
| 2010/0131415 A1 | 5/2010 | Sartipi | |
| 2010/0185461 A1 | 7/2010 | Broeska et al. | |
| 2010/0205063 A1 | 8/2010 | Mersky | |
| 2010/0293536 A1 | 11/2010 | Nikitin | |
| 2010/0299194 A1 | 11/2010 | Snyder et al. | |
| 2010/0304852 A1 | 12/2010 | Szrek | |
| 2011/0035268 A1 | 2/2011 | Rossi | |
| 2011/0040684 A1 | 2/2011 | Beck et al. | |
| 2011/0106698 A1 | 5/2011 | Isaacson | |
| 2011/0161226 A1 | 6/2011 | Courtion | |
| 2011/0202419 A1 | 8/2011 | Mamdani | |
| 2011/0234514 A1 | 9/2011 | Gothard | |
| 2011/0246284 A1 | 10/2011 | Chaikin | |
| 2012/0136780 A1 | 5/2012 | El-Awady | |
| 2012/0209688 A1 | 8/2012 | Lamothe et al. | |
| 2013/0073388 A1 | 3/2013 | Heath | |
| 2013/0179177 A1 | 7/2013 | Dhavle et al. | |
| 2013/0290121 A1 | 10/2013 | Simakov | |
| 2013/0304561 A1 | 11/2013 | Warner et al. | |
| 2014/0006268 A1 | 1/2014 | Roberts | |

(56) References Cited

U.S. PATENT DOCUMENTS

| | | |
|---|---|---|
| 2014/0019238 A1 | 1/2014 | Blatchley |
| 2015/0278845 A1 | 10/2015 | Sorem et al. |
| 2017/0076293 A1 | 3/2017 | Cage |

FOREIGN PATENT DOCUMENTS

| | | |
|---|---|---|
| JP | 2002189963 A | 7/2002 |
| JP | 2003208541 A | 7/2003 |
| JP | 2008541303 A | 11/2008 |
| JP | 2010521017 A | 6/2010 |
| KR | 20020027427 A | 4/2002 |
| WO | 2013078499 A1 | 6/2013 |

\* cited by examiner

SYSTEMS AND METHODS FOR USING INDICIA OF MEMBERSHIP AS A PARTIAL AUTHORIZATION IN A TRANSACTION

RELATED APPLICATIONS

The present application is a continuation-in-part and claims priority to U.S. patent application Ser. No. 14/070,800, filed on Nov. 4, 2013, which is incorporated herein by reference in its entirety.

BACKGROUND OF THE INVENTION

The present invention is generally directed to systems and methods for providing benefits to members of certain membership groups. More specifically, the present invention is directed to using Information identifying a member to initiate a partial authorization transaction over existing credit and or debit networks.

The provision of benefits to members of certain membership groups is generally known in the art, for example, members of the Automobile Association of America ("AAA") may receive reduced rates at hotels and/or motels. Similarly, members of various professional organizations may receive reduced insurance plans, scholarly material, etc. However, it can be difficult for membership organizations to otter various benefits to its members due to the difficulty in both establishing benefits with various retailers, manufacturers, etc. and in redeeming the benefits with the same.

Moreover, various retailers and/or manufacturers may be hesitant to provide membership benefits when such benefits cannot be tightly controlled. For example, instances of fraud through using expired or borrowed AAA cards may be high. Similarly, retailers and/or manufacturers may be hesitant to provide benefits when such benefits may be used widespread in an unanticipated fashion (much as, for example, merchants did not anticipate the mass-forwarding of digital coupons or limitations on promotional sites such as GrouPOn or Living Social).

It is therefore desirable to have systems and methods that can provide membership benefits to various retailers and/or manufacturers that can be tightly controlled. It is also desirable to utilize existing networks—such as existing debit and credit networks—to transact such benefit transactions, thereby making any retailer and/or manufacturer that accepts credit or debit cards potential parts of the membership network.

Moreover, it is desirable to provide a single product that can process both membership benefits in the form or a partial authorization as well as act in certain circumstances, as a payment mechanism linked to an open-loop or stored-loop stored value account. Such a product may receive incentives, be linked to promotions, and be able to be processed both at participating merchants for eligible goods and/or services, but also to be widely accepted at other merchants for ineligible goods and/or services.

SUMMARY OF THE INVENTION

In accordance with some embodiments of the present invention, aspects may include a method for using a membership card to obtain benefits in a purchase transaction for goods or services at a merchant, the membership card comprising an indicia printed or otherwise recorded thereon, the method comprising: receiving at a central processor a communication from a point of sale comprising: one or more identifiers of goods or services selected in the purchase transaction; and information identifying the membership card, comprising at least a portion of the Indicia; determining by the central processor potential benefits, if any; associated with the membership card; determining by the central processor if any potential benefits are applicable to the merchant, the point of sale, or the one or more goods or services identified by the received identifiers: determining a transaction benefit amount applicable to the transaction; and sending to the point of sale a partial authorization m the amount of the transaction benefit amount.

In accordance with some embodiments of the present invention, aspects may include a system for using a membership card to obtain benefits in a purchase transaction for goods or services at a merchant, the membership card comprising an indicia printed or otherwise recorded thereon, the system comprising: a point of sale interface in selective communication with a point of sale configured to receive from the point of sale a communication comprising: one or more identifiers of goods or services selected in the purchase transaction; and information identifying the membership card, comprising at least a portion of the indicia; a database comprising one or more records associated with the membership card, the records comprising: potential benefits associated with the membership card; and a processor in selective communication with the point of sale interface and the database, configured to: access the database and determine, based at least in part on the communication from the point, of sale, potential benefits that are applicable to the merchant, the point of sale, or the one or more goods or services identified by the received identifiers; determine a transaction benefit amount applicable to the transaction; send to the point of sale via the point of sale interface a partial authorization in the amount of the transaction benefit amount.

In accordance with some embodiments of the present invention, aspects may include a method for using a membership card to obtain benefits in a purchase transaction for goods or services at a merchant, the membership card comprising an indicia printed or otherwise recorded thereon, the method comprising: receiving at a central processor a communication from a point, of sale over a credit or debit network, the communication comprising: one or more identifiers of goods or services selected in the purchase transaction; and information identifying the membership card, comprising at least a portion of the indicia; determining by the central processor potential benefits, if any, associated with the membership card, such determination based at least in part upon communicating with a database, the database including one or more records potential benefits associated with the membership card; determining by the central processor benefit criteria that must be met in order for the transaction to be eligible for benefits; determining if the benefit criteria has been met, and if so determining a transaction benefit amount applicable to the transaction: and sending to the point of sale at least in part over a credit or debit network a partial authorization in the amount of the transaction benefit amount.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWING

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment, of the invention is explained in detail it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that, the phraseology and terminology used herein is for the purpose of description and should not be regarded as limiting. The detailed description will make reference to the following figures, in which.

Figure 1:
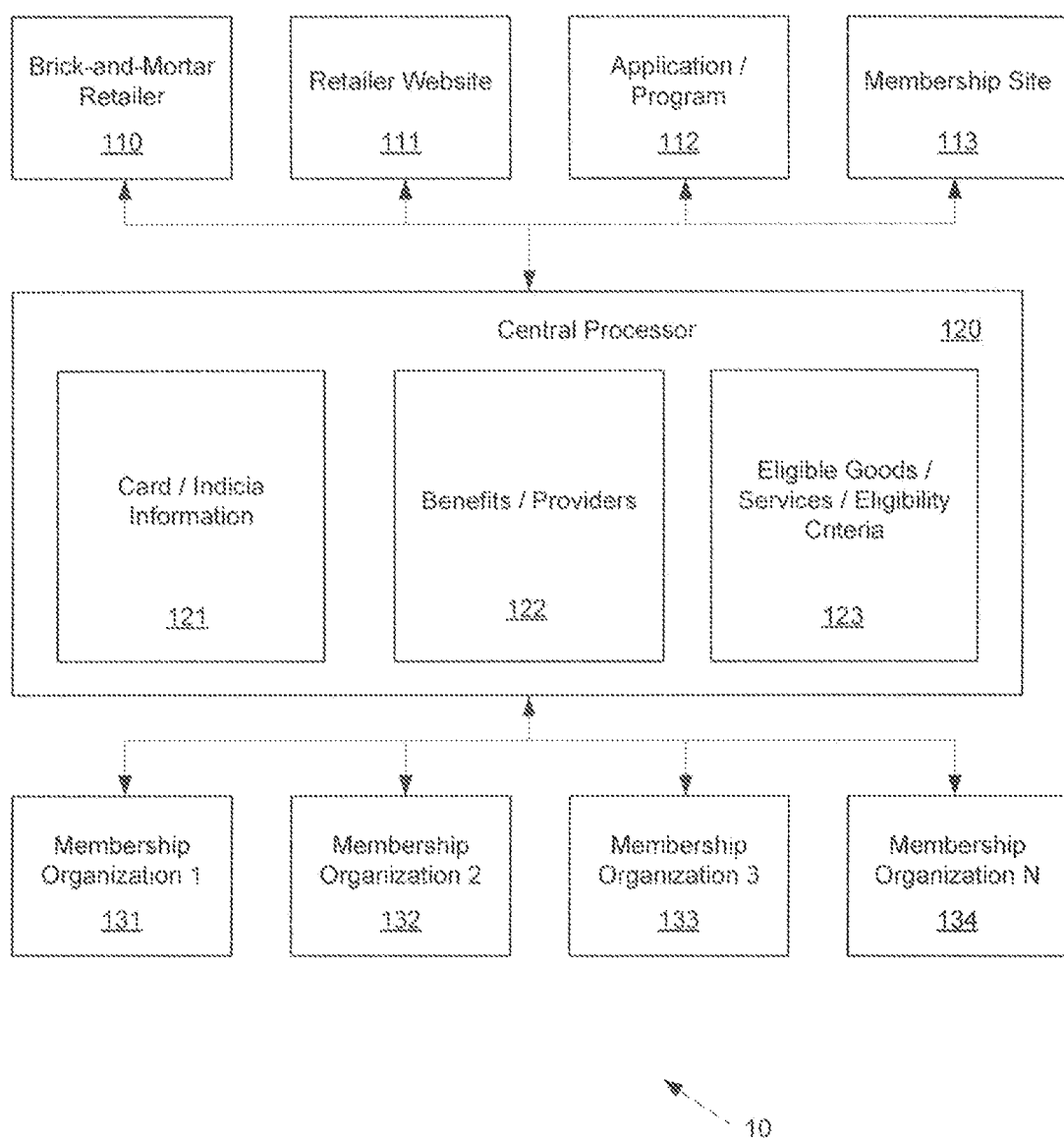
FIG. 1 illustrates an exemplary system for processing membership benefits in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein, is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, the present invention is directed to systems and methods of using a membership card to obtain discounts, promotions, value reductions, coupons, etc. More specifically, the transaction using the promotional card is routed over a credit or debit card network as a partial-authorization, request. Accordingly, merchants that accept credit or debit cards may more easily partake in membership or promotional programs.

For example, a membership group—such as, for example, the Automobile Association of America ("AAA"), an alumni group, etc.—may negotiate discounts, promotions, value reductions, coupons, etc. (referred to as "benefits") for its membership group. Such benefits may be a discount off of a transaction total at a certain merchant, or at a certain merchant location (such as a specific retail outlet, or online) or a discount off a transaction total at any of a group of merchants. For example, merchants may be grouped by a merchant connection (such as shared corporate ownership), or a class of goods and/or services (such as all hotels). Alternatively, benefits may be applied at the good or service level, such as a discount at of a specific product with a specific stock keeping unit (SKU) or universal price code (UPC). Benefits may be applied based upon various codes—such as merchant category codes (MCC), standard industrial classification codes (SIC), international standard industry codes (ISIC), etc.

It can be seen that the present invention provides ability for various membership organizations to negotiate and/or otherwise obtain benefits for its members that can be cm the level of merchants or specific products. Moreover, membership benefits may be stored at a database or data store, and may be updated by the membership organization, an intermediate party, central processor, program sponsor, etc. It is contemplated that merchants, manufacturers, providers, and/or any other party may be able to submit and/or modify benefits offered by the party.

With reference to FIG. 1, an exemplary overall system 10 in accordance with some embodiments of the present invention will now be discussed. System 10 may comprise one or more points of sale, which may take place at a physical "brick-and-mortar" location 110, such as a store, retail outlet restaurant, hotel, etc., a website over which transactions can be conducted 111, an application, program, applet or "app" running on a computing device such as a smart phone 112, or even through a website or digital location associated with, the membership organization itself 113. The system 10 may further comprise a central processor 120 which in turn may comprise one or more data stores storing information related to membership cards 121, benefits 122, and/or specific eligible goods and/or services 123. The system 10 may further comprise, and the central processor 120 may be in selective communication, with one or more membership organizations 131-134. Each membership organization 131-134 may have specific benefits, card information, etc. associated with membership cards. The central processor 120 may be in selective communication with both the points of sale 110-113 at which transactions potentially involving membership benefits may take place. The central processor 120 may comprise the data stores by having, for example, databases in connection with the central processor, or the central processor may reach out to the membership organizations which may maintain their own databases of members and applicable member benefits.

Figure 2:
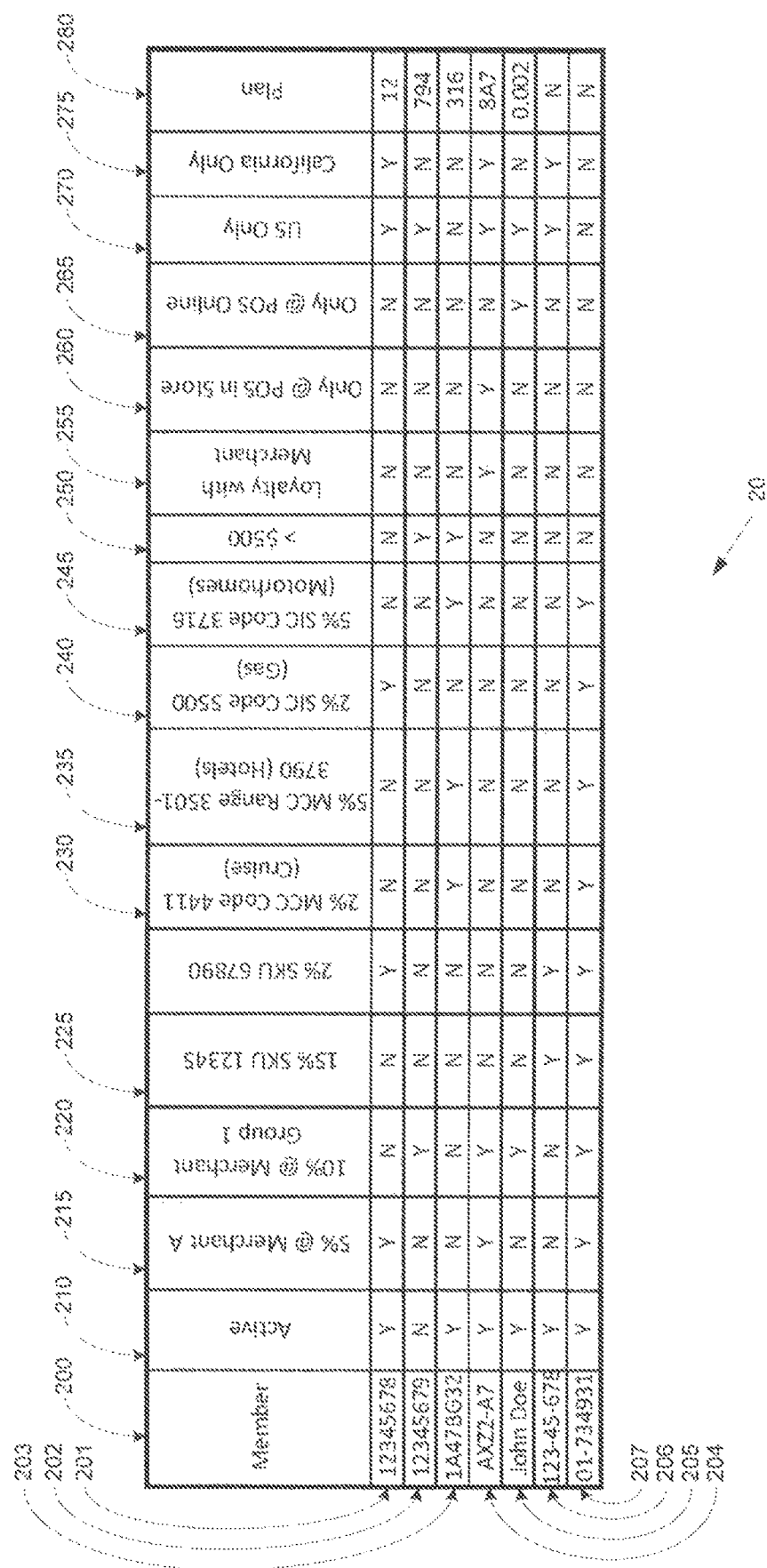
FIG. 2 illustrates an exemplary database in accordance with some embodiments of the present invention.

With reference to FIG. 2, an exemplary database 20 in accordance with some embodiments of the present invention will now be discussed. Database 20 may comprise information setting forth benefits that may be applicable to one or more users 201-207. Users 201-207 may be identified by any type of an indicia or an identifier. The user identifiers may be unique or semi-unique, or may be shared by a group—for example, by a class of membership. For example, a user may be identified through a numeric indicia at 201, 202, an alphanumeric indicia at 203-204, a name at 205, a social security number 206 or employer identification number (EIN) at 207. It is also contemplated that a user may be identified by various factors that may form the basis for an identifier. For example, John Doe may be a member of AAA, a graduate of State University, a member of Civitan and the National Rifle Association. Each of these factors may form portions of John Doe's identifier.

In addition to listing members, the database may also list factors pertaining to such members, such as whether or not such members are active 210. If a member is inactive, he or she may not be entitled to benefits, or may be entitled to a reduced amount of benefits. The database may also list various benefits and/or benefit eligibility factors, such as, for example, noting which, members may receive 5% off at Merchant A at 215. Accordingly, a member who receives 5% off from Merchant A may use his or her membership card to obtain a 5% discount.

As discussed in greater detail below, it is contemplated that a PCS may communicate with the central processor to determine if the discount is appropriate, and if so may process the transaction using a debit or credit card network as a "partial authorization."

Similarly, a member may be entitled to receive 10% off of any purchases at Merchant Group 1 at 220, which may comprise a group of merchants—for example, related merchants that are part of a corporate family (for example, Gap, Old Navy, and Banana Republic), or may be a group of merchants that are related (for example, office supply stores), or a group of merchants that agree to be part of a group with no other connection or association.

Members may also receive benefits on a product or service level for example receiving 15% off a product with a specific stock keeping unit (SKU) at 225 or other identifier (such as a UPC). Similarly, benefits may be tied to or associated with classes of merchants, which may be identified through the use MCC codes at 230, MCC code ranges at 235, or SIC codes at 240, 245. For example, a member may receive 2% off of purchases associated with cruise lines at 230 (MCC code 4411) or 5% off hotel stays (MCC code range 3501-3790). Similarly, a member may receive 2% off of purchases at gas stations (SIC code 5500), or 5% off the purchase of motorhomes (SIC code 3716).

Various other eligibility requirements may be listed in the database. For example, in order to obtain any discount or benefit, the transaction may be required to be for an amount greater than or equal to $500 at 250. At 255, eligibility criteria may require that the customer be a loyalty member of the retailer (for example, be registered with a grocery store "club card" and/or have a credit account associated with the retailer such as a "Macy's Card").

Farther eligibility criteria may limit the purchase location of the transaction (only in store at 260, only on-line at 265). Eligibility may be geographically driven at, 270 (requiring the transaction to occur in the United States) and at 275 (requiring transactions occur in the State of California).

It Is also contemplated that such factors related to eligibility, criteria, and benefits may fee summarized in a "plan" associated with a member, much as different insurance plans provide for different member benefits. A plan may be set forth at 280.

In practice, a central processor may receive a transaction request related to member 12345678 (at 201). The member may be determined to be active, and may be eligible for 5% off at Merchant A (at 215), 2% off of item with SKU 67890, 2% off of gasoline (based on SIC code 5500 at 240, redeemable only in the United States at 270 and specifically only in California at 275.

Similarly, with continued reference to FIG. 2, Member 12345679 may be inactive at 210, and may only be eligible for 10% off of Merchant Group 1 at 220 and only for purchases greater than or equal to $500 at 250, redeemable in the United States at 270, Member 1A47BG32 may be active, but may only be eligible for benefits related to MCC code 4411 (Cruise lines), MCC codes 3501-3700 (hotels), SIC code 3716 (motorhomes), and only for purchases greater than or equal to $500.

It can be seen with reference to FIG. 2 that various members and/or member plans can have different benefits and eligibility criteria.

Figure 3:
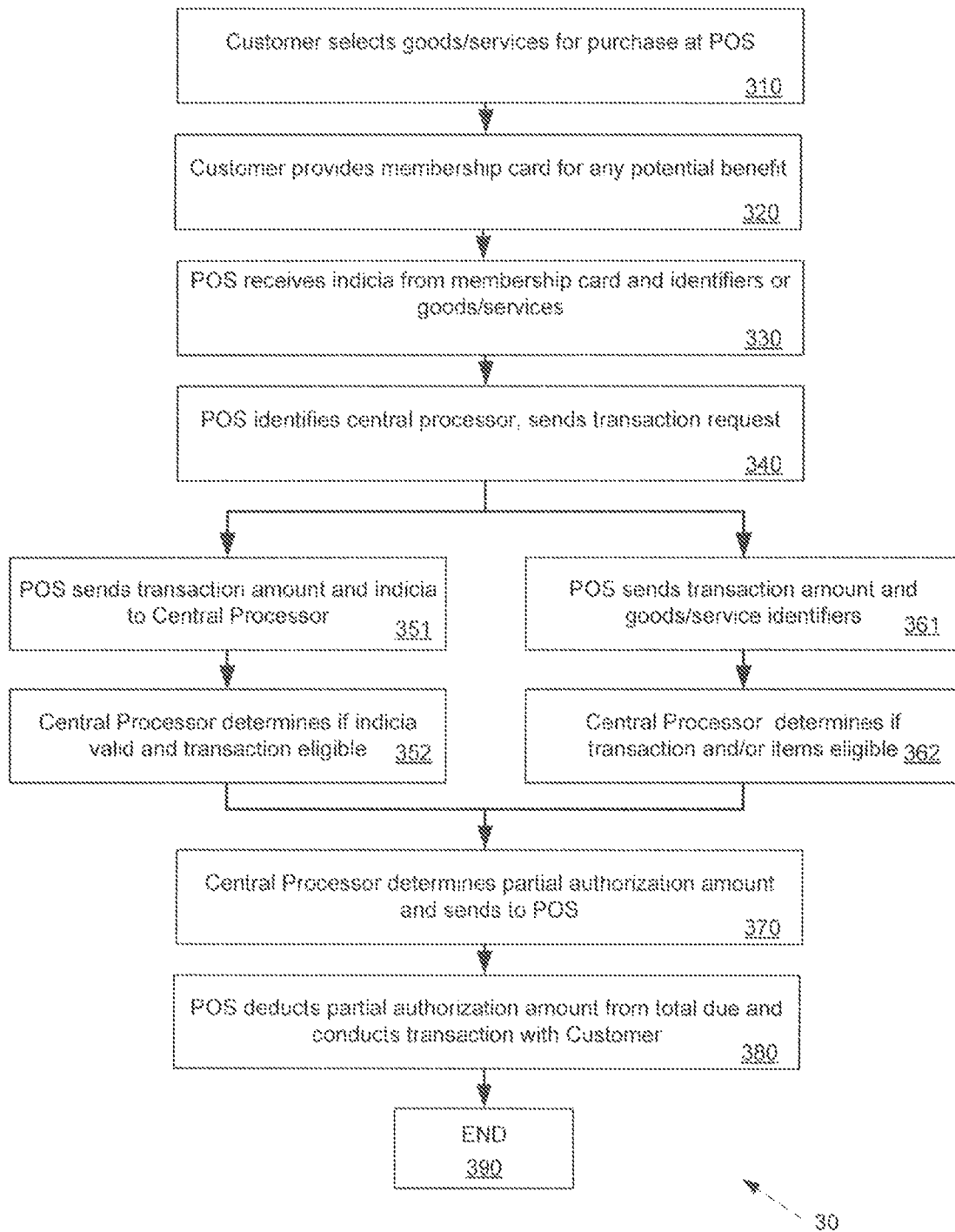
FIG. 3 illustrates an exemplary process of determining and applying potential membership benefits in accordance with some embodiments of the present invention.

With reference to FIG. 3, a general process 30 for determining and applying potential membership benefits in accordance with some embodiments of the present invention will now be discussed. At 310, a customer may select goods and/or services for purchase or to otherwise obtain at a point of sale. As noted above, a point of sale may be a point of sale terminal at a merchant, a webpage, digital store front, application or program, or even where a transaction may be conducted over a telephone, such as in the ease of a catalog order (where a customer may call a number and order goods and/or services).

At 320, the customer may present or provide a membership card at the POS in order to obtain any applicable or potential discount or benefit. The customer may provide, for example, a membership card with machine-readable indicia printed or recorded thereon. At 330 the POS may receive the indicia identifying the membership of the customer. For example, a POS may receive an indicia by reading a bar code or a magnetic strip on the membership card. Alternatively, the indicia may be read via radio frequency identification (RFID) communications, near field communications, and/or any other type of communications, it is also contemplated that the customer may merely recite or read an identifier of the customer that may be entered into the POS by either the customer or a sales associate using the POS.

The POS may read an identifier on a card, which may be a settlement or non-settlement identifier. For example, a membership card may include a non-settlement identifier, or bank identification number (BIN) that, if run through a standard financial network, will result in the transaction being declined. However, if the same identifier is run through a merchant or network that is affiliated with the membership program, the non-settlement identifier may be recognized and utilized for either a partial authorization (thereby acting as a discount), or as a toll payment, source (which may access a value account associated with the identifier).

At 330 the POS may also receive identifiers of the goods and/or services selected for purchase by the customer. For example, as is known in the art the POS may scan bar codes that may represent SKUs of the goods and/or services selected.

At 340, the POS may determine the central processor to which to route the membership transaction. This determination may be based on the membership indicia. For example, the POS may be configured to recognize the transaction, based upon an indicia on the card, such as an included issuer identification number (UN), bank identification number (BIN), or other such information.

At 340, the POS routes a transaction message to the central processor. It is contemplated that the transaction message may contain merely the membership Indicia and the transaction total, as well as an identification of the merchant or POS from whom the transaction is initiated, in accordance with some embodiments of the present invention, the transaction message may include information identifying each good and/or service sought to be obtained by the customer in the transaction. For example, a transaction message formatted in accordance with ISO 8583 this information may be included in Bit 111, which allows for 9999 characters of discretionary information. A transaction message that includes information identifying all items in the market basket may; for example, list the universal price codes (UPCs) of such, items. Since the typical UPC is 12 characters long, over 800 items can be listed in a transaction. Should more information be needed, Bit 112 is also available for discretionary information.

Step 351 depicts a pan of the process if the POS sends a transaction message comprising the transaction amount and the membership indicia. At 352, the central processor may determine if the indicia, is valid, and if the transaction is eligible. Eligibility may be based upon the merchant or PCS requesting the transaction, geographic location, etc. (such potential eligibility criteria are discussed in part above with regard to FIG. 2).

At 361 the POS may send identifiers of each good and/or service selected in the transaction as well as the membership indicia. Note that this transaction may be submitted to the central processor via a credit or debit rail (for example: VisaNet or the MasterCard Network), or may be through a direct connection to the central processor. Alternatively, such transaction may be sent over a network, which may be public (e.g., the Internet), Note that if a credit or debit rail is utilized, the transaction must be submitted by the merchant or an acquirer for clearing and settlement to the credit/debit entity—as such entity may reject the transaction. Rather, the account may ride such rails as a communication network, but not utilize the same for clearing and settlement.

At 362 the central processor may determine if the membership indicia is valid, and if the overall transaction and/or specific goods or services are eligible for membership benefits. Note that if the merchant or POS is not recognized as a party affiliated with the membership program represented by the membership indicia, the transaction may be terminated.

At 370, the central processor may determine a total benefit amount, and send a partial authorization in the amount of this benefit back to the POS. The benefit amount may be an actual amount of discount (e.g., the amount of partial authorization), or may set forth a replacement rate for the goods/service that the merchant may charge, according to business rules established associated with the membership program. At 380 the POS may deduct the partial authorization amount from, the total amount due and conduct the transaction with the customer for the reduced amount. The process may then end at 390.

Figure 4:
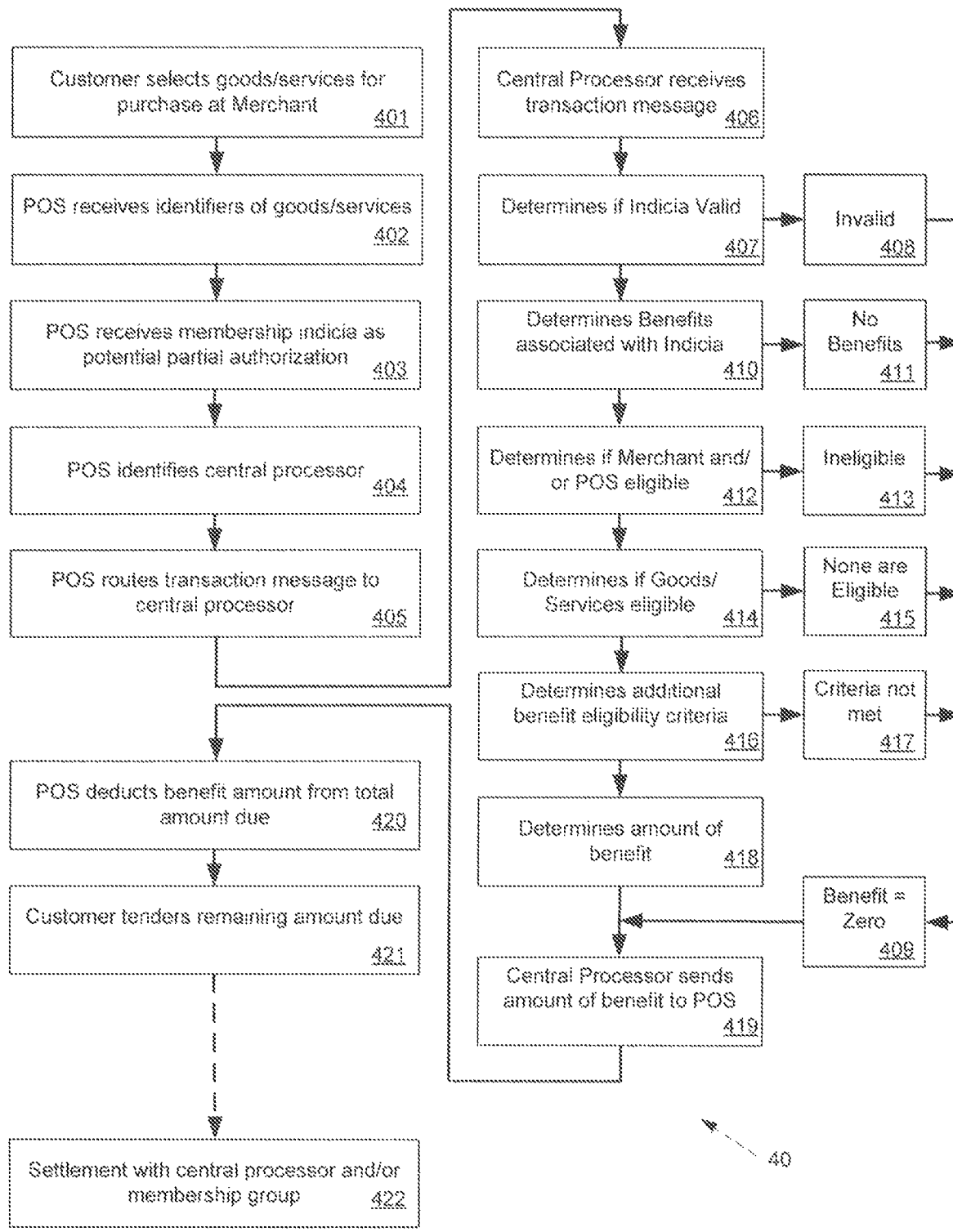
FIG. 4 illustrates an exemplary process for utilizing a membership card to provide membership benefits in the form of a partial authorization in accordance with, some embodiments of the present invention.

With reference to FIG. 4, an exemplary process 40 for utilizing a membership card to provide membership benefits in the form of a partial, authorization in accordance with some embodiments of the present invention will now be discussed. At 401 a customer may select goods and/or services for purchase or to be otherwise obtained (for example, a digital file or movie disc may be rented rather than purchased or permanently obtained). At 402 the POS may receive identifiers of the goods and/or services in the transaction request. At 403, the POS may receive a membership indicia from the customer. The customer may provide the membership indicia as potential source for a partial authorization. The customer may be aware of an applicable benefit, or the customer may wish to have the membership card run to determine if there are any applicable benefits of which the customer is not specifically aware. At 404 the POS may determine the processor to which to send the membership partial authorization request. This determination may be based on the membership indicia. For example, much as a credit or debit transaction is routed based on an included IIN, or gift cards are routed to the proper processor based upon an identifier much like en IIN or BIN programmed Into the POS, the membership transaction may be routed to the appropriate processor.

It is contemplated that the transaction may be routed over a private network or over a credit or debit network, such as Visa, Discover, MasterCard, American Express, etc. In this manner, membership organizations may leverage existing networks to provide widespread benefits to members at various retailers, etc.

At 405 the POS may route the transaction message to the central processor. As noted above, the transaction message may comprise the total amount due and the membership indicia, but may also include identifiers of the goods and/or services that are associated with the transaction. The transaction message may also Include an identification of the merchant requesting the transaction, the specific requesting POS, and/or other information such as time/day/date stamp, geographic location, etc.

At 406 the central processor may receive the transaction message and at 407 the central process may determine if the indicia is valid, if the indicia is determined to be invalid at 408, the amount of benefit or partial authorization for the transaction may be set to zero at 409. If the indicia is valid, the central processor may determine benefits associated with the indicia at 410, for example by referencing a data store that includes various membership and benefit information. If there are no benefits associated with the Indicia at 411, the amount of benefit or partial authorization for the transaction may be set to zero at 409.

At 412 the central processor may determine if certain eligibility on the part of the merchant and/or POS are met. If the merchant and/or POS is ineligible for benefits at 413, then, again the amount of benefit or partial authorization for the transaction may be set to zero at 409.

At 414, the central processor may determine if any of the goods or services identified in the transaction message are eligible for benefits. If at 415 it is determined that no goods or services identified in the transaction message are eligible for benefits, the amount of benefit or partial authorization for the transaction may be set to zero at 409. At 416 the central processor may determine any other benefit eligibility criteria—such, as, for example, whether a proper combination of goods and/or services are purchased, or that the customer is a loyalty member of the merchant. If such eligibility criteria is not met at 417, the amount of benefit or partial authorization for the transaction may be set to zero at 409.

Note that while FIG. 4 and the above discussion sets forth an order of steps, the present invention contemplates that the specific order may be altered, changed, and modified.

At 418, the central processor may determine the amount of benefit or partial authorization to be applied to the transaction. For example, benefits may have provided a customer with 10% off of a specific product, 5% off of a specific class or type of products, and 2% off of any purchases at the merchant. The central processor may then, based upon each benefit and/or any rules regarding the combination of benefits (some may not be combined, some may only offer the customer the most advantageous benefit etc), determine the total benefit amount and send this amount to the POS at 419. Note that if the benefit amount was previously set to zero at 409, the amount of zero will be sent to the POS at 419.

At 420, the POS may deduct the amount of the benefit or partial authorization, from the total amount due for the transaction. At 421, the customer may tender the remaining amount due and complete the transaction.

It is contemplated by the present amendment that some membership benefits may be negotiated between merchants, manufacturers, etc. and membership organizations and a later settlement may be unnecessary. Similarly, in some situations the membership benefit may be considered a "coupon" and redeemed and transacted as such. In accordance with some embodiments of the present invention, certain promotions or benefits may be "purchased" by membership organizations, and accordingly at 422 settlements may occur at a subsequent time between the merchant and the central processor and/or the membership organization.

Figure 5:
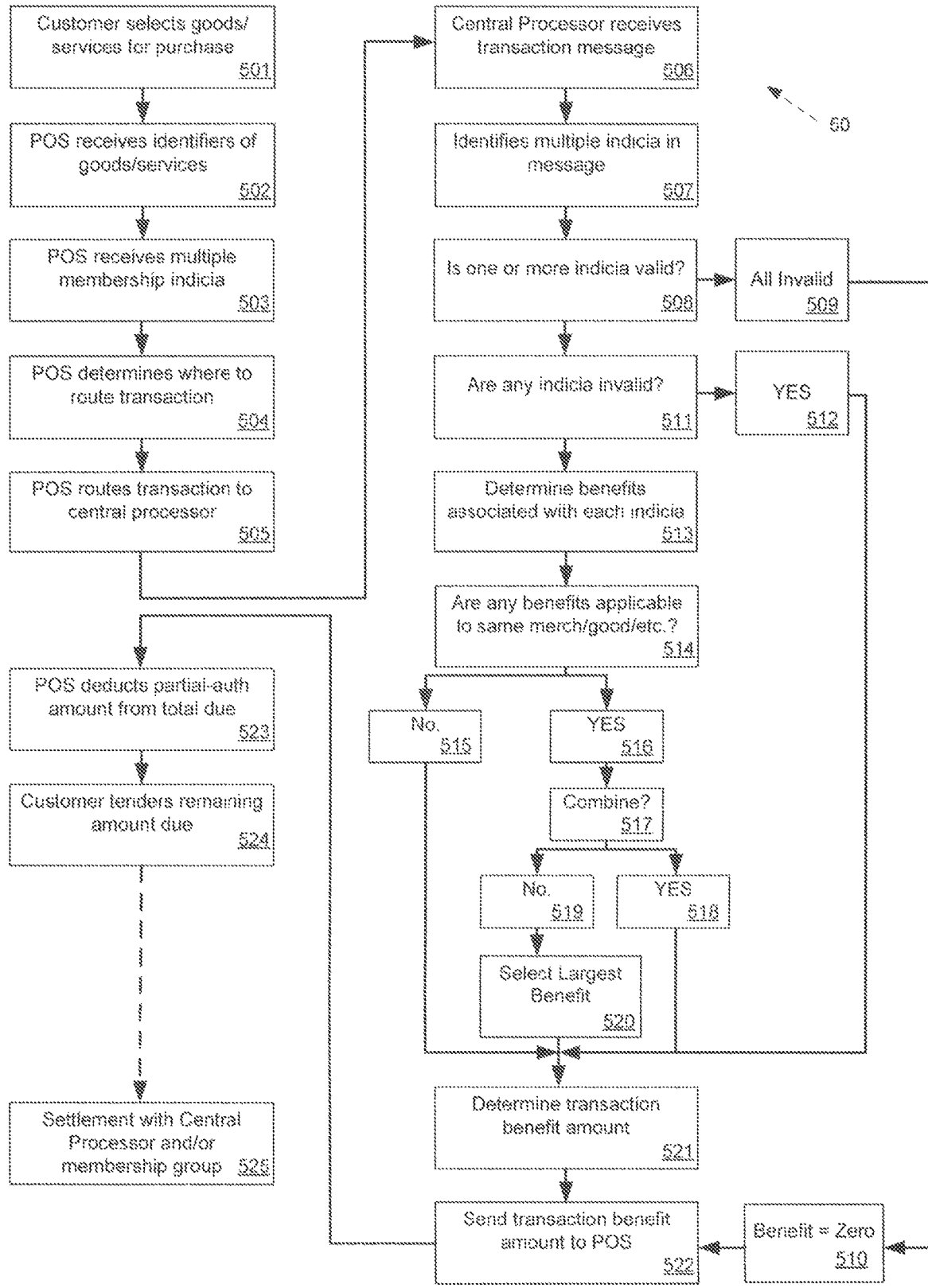
FIG. 5 illustrates an exemplary process for performing a transaction with, a customer who belongs to multiple membership organizations, in accordance with some embodiments of the present invention.

With reference to FIG. 5, an exemplary process 50 for performing a transaction with a customer who belongs to multiple membership organizations, in accordance with some embodiments of the present invention, will now be discussed. At 501 a customer may select goods and/or services for purchase or to otherwise obtain at a merchant. At 502 identifiers of the goods and/or services may be received by the POS. As noted above, this can occur in a variety of ways including reading a bar code (such as a SKU or UPC), magnetic stripe, RFID communications, etc. At 503 the POS may receive multiple indicia from the customer identifying multiple membership organizations of which the customer may be a member. The multiple indicia of multiple membership organizations may be provided as a potential partial authorization for the transaction associated with the selected goods and/or services.

At 504, POS may determine where to route the membership transaction request, based at least in pan on one or more of the indicia. Note that it is contemplated that rather than combine the membership indicia into a single transaction, the POS may perform various membership transaction in series. In this situation, a process similar to that described in FIG. 4 and discussed above may be repetitively applied. In contrast, the various membership indicia may be combined and sent in a single transaction to a central, processor for sorting out benefits, etc.

At 505 the POS may route the transaction request, to the identified central processor.

At 506 the central processor may receive the transaction message, which may comprise for example, the total amount of the transaction and one or more membership indicia. The transaction message may also include an identification of the merchant and/or POS from which the transaction message was sent. The transaction message may also include one or more Identifiers of the goods and/or services sought to be obtained in the transaction.

At 507 the central processor may identify the one or more membership indicia and may determine at 508 that at least one of the membership indicia is valid. If none of the membership indicia are determined to be valid at 509, then at 510 the membership benefit may be set to zero.

If any of the indicia are invalid at 511 and 512, then the benefit amount associated with such indicia may be set to zero, but the transaction may continue for the valid indicia. At 513 the central processor may determine benefits associated with each valid indicia. At 514 the central processor may determine if any benefits from different membership indicia are applicable to the same merchant, goods and/or services, transaction, etc. If there is no overlap at 515, the central processor may determine the benefit amount or partial authorization amount at 521 and send such amount to the POS at 522. If it is determined at 516 that there is overlap and multiple membership indicia offer benefits applicable to the same merchant, goods and/or services, transaction, etc., then at 517 the central processor may determine if the benefits can be combined. This may determination may be based upon reference to benefit eligibility or to a data store of program rules.

If it is determined at 518 that the benefits can be combined, then at 521 the central processor may determine the benefit amount or partial authorization amount at 521 and send such amount to the POS at 522. If it is determined at 519 that the benefits cannot be combined, then at 520 the central processor may select the largest or most advantageous benefit amount and ignore lesser and accordingly unselected benefit amounts. At 521 the central processor may then determine the total amount of the benefit or partial authorization and may send this amount to the POS at 522.

At 523 the POS may receive the total benefit amount in the form of a partial authorization, and may deduct the amount of the partial authorization from the transaction total. At 524 the customer may tender the final amount due in order to complete the transaction.

Much as noted, above with regard to FIG. 4, it is contemplated by the present amendment that some membership benefits may be negotiated between merchants, manufacturers, etc. and membership organizations and a later settlement may be unnecessary. Similarly, in some situations the membership benefit may be considered a "coupon" and redeemed and transacted as such. In accordance with some embodiments of the present invention, certain promotions or benefits may be "purchased" by membership organizations, and accordingly at 525 settlements may occur at a subsequent time between the merchant and the central processor and/or the membership organization.

One of the potential advantages of the present invention, is the ability with which members and membership benefits can be updated without the need, to inform every participating merchant and/or retailer. For example, with reference to FIG. 6, a process 60 of updating membership information in accordance with some embodiments of the present invention will now be discussed.

Process 60 may comprise a membership organization altering benefits for its members at 610. Alternatively—or in addition to—the membership organization may also update the membership list at 611. This information can be updated in the database in several manners. At 620 the membership organization may reach into a database or data store maintained by a central processor and update the information (here, the database or data store may reside with or be primarily associated with the central processor). At 621 the membership organization may modify its own database or data store with which it, provides the central processor with access (here, the database or data store may reside with or be primarily associated with the membership organization). At 622 the membership organization, may send a message to the central processor requesting changes be made, and at 623 the central processor may make such changes, Regardless of the manner, at 630 the membership database may be updated without the need to inform any other parties, merchants, etc.

Figure 6:
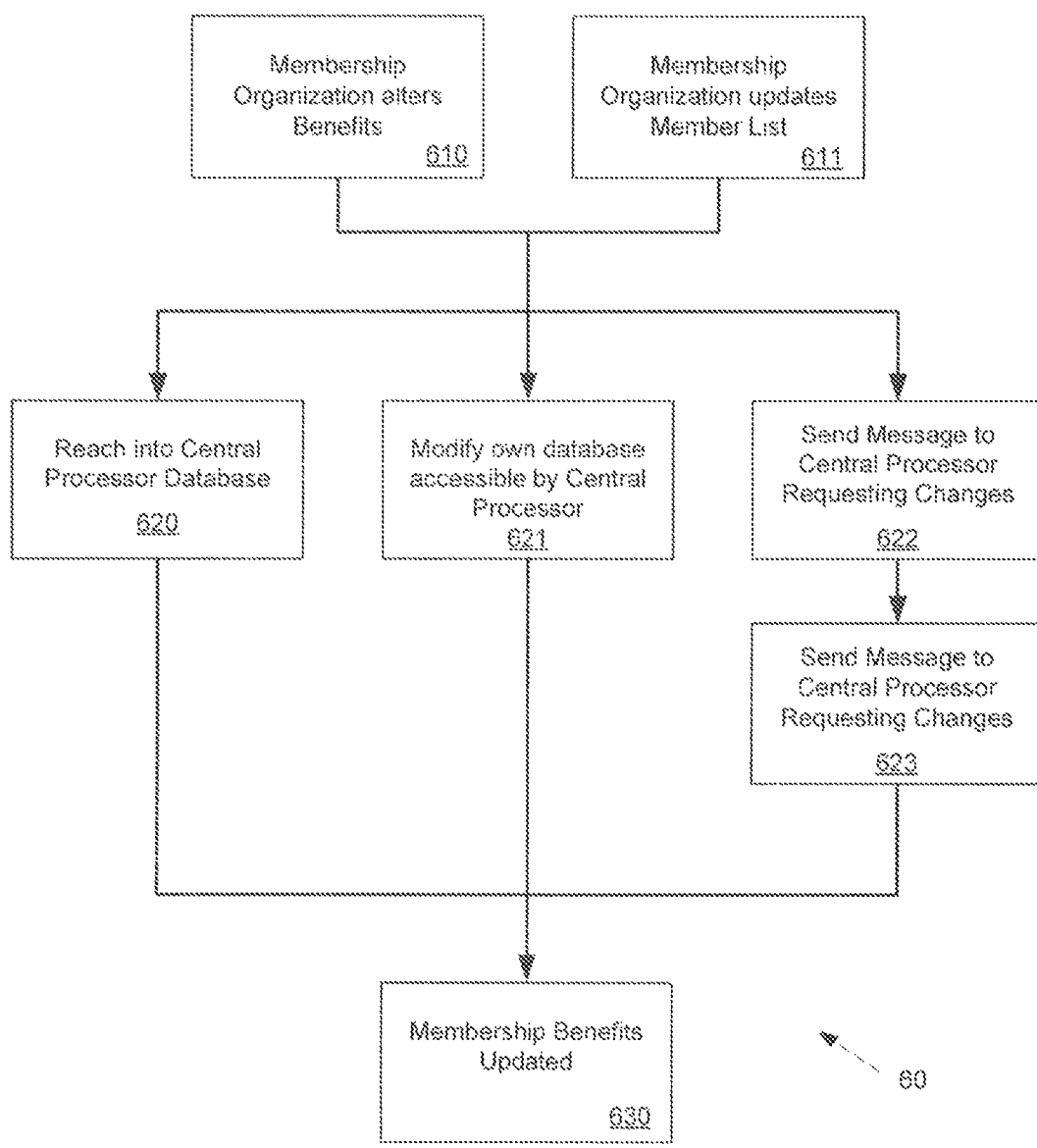
FIG. 6 illustrates an exemplary process of updating membership information in accordance with some embodiments of the present invention.

In addition, although FIG. 6 and the discussion above is focused on the membership organization modifying membership benefits, it is also contemplated that a similar methodology and/or connections may be used by participating merchants, retailers, manufacturers, and/or other participating providers to establish, modify, or cease their participation in the membership program, for example, a manufacturer may reach in to a database (much like 620), modify its own benefits database that the central processor has access to (much like 621), or send a message to the central process (much like 622) when or if it chooses to modify the benefits it provides. An example may be in a situation where a manufacturer agrees to provide the first 1.000 products purchased by members at a 20% price. Once 1,000 sales are recorded, the manufacturer may wish to alter or cease the associated benefit. In this manner, the promotional aspect of membership benefits may be more dynamically established and managed, thereby providing greater benefits to members with more control, to merchants, manufacturers, etc.

It will be understood that, the specific embodiments of the present invention shown and described herein are exemplary only. Numerous variations, changes, substitutions and equivalents will, now occur to those skilled, in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A method for using a membership card to obtain benefits in a purchase transaction for goods or services at a merchant, the membership card not being associated with stored value and comprising an indicia printed or otherwise recorded thereon, the method comprising:
    receiving at a central processor a communication from a point of sale comprising:
        one or more identifiers of goods or services selected in the purchase transaction; and
        information identifying the membership card, comprising at least a portion of the indicia;
    determining by the central processor potential benefits, if any, associated with the membership card;
    determining by the central processor if any potential benefits are applicable to the merchant, the point of sale, or the one or more goods or services identified by the received identifiers;
    determining a transaction benefit amount applicable to the transaction;
    sending to the point of sale over a credit or debit card network, a partial authorization in the amount of the transaction benefit amount.

2. The method of claim 1, wherein the central processor receives the communication from the point of sale over a credit or debit network.

3. The method of claim 1, wherein the transaction benefit amount is a percentage discount applicable to specific goods or services or to an entire transaction amount.

4. The method of claim 1, wherein the point of sale is selected from the group consisting of: a point of sale terminal, a merchant location, a merchant group, a subset of point of sale terminals at a merchant, a merchant gateway, a computer, a digital storefront, an application or software running on a user computing device or mobile device, and a terminal located remotely from a customer managed by an operator.

5. The method of claim 1 further comprising:
    determining by the central processor additional benefit criteria that may be applicable to the customer, merchant, transaction, goods or service, geographic location, total purchase amount, or customer membership in additional programs.

6. The method of claim 1, wherein the identifiers of goods or service may comprise stock keeping units (SKUs) or universal price codes (UPCs).

7. The method of claim 1, wherein the identifiers of goods or services identifies a type of good or service identified in a transaction, and not individually delineate each good or service purchased.

8. The method of claim 7, wherein the identifiers may comprise a merchant category code (MCC), a standard industry classification (SIC) code, a North American Industry Classification System (NAICS) code, or a Global Industry Classification Standard (GICS) code.

9. The method of claim 1, wherein the central processor determines potential benefits, if any associated with the membership card based at least in part upon accessing a database comprising membership card records.

10. The method of claim 9, wherein the membership card records comprise an identifier of an applicable benefits plan associated with a membership card.

11. The method of claim 10, wherein the central processor determines if any potential benefits are applicable to the merchant, the point of sale, or the one or more goods or services identified by the received identifiers based at least in part upon the applicable benefits plan.

12. The method of claim 1, wherein the central processor determines if any potential benefits are applicable to the merchant, the point of sale, or the one or more goods or services identified by the received identifiers based at least in part upon accessing a database comprising membership card records.

13. A system for using a membership card to obtain benefits in a purchase transaction for goods or services at a merchant, the membership card not being associated with stored value and comprising an indicia printed or otherwise recorded thereon, the system comprising:
    a point of sale interface in selective communication with a point of sale configured to receive from the point of sale a communication comprising:
        one or more identifiers of goods or services selected in the purchase transaction; and
        information identifying the membership card, comprising at least a portion of the indicia;
    a database comprising one or more records associated with the membership card, the records comprising:
        potential benefits associated with the membership card; and
    a processor in selective communication with the point of sale interface and the database, configured to:
        access the database and determine, based at least in part on the communication from the point of sale, potential benefits that are applicable to the merchant, the point of sale, or the one or more goods or services identified by the received identifiers;
        determine a transaction benefit amount applicable to the transaction;
        send to the point of sale via the point of sale interface over a credit or debit card network, a partial authorization in the amount of the transaction benefit amount.

14. The system of claim 13, wherein the database resides with a membership organization associated with the membership card.

15. The system of claim 13, wherein the transaction benefit amount determined by the processor is a percentage discount applicable to specific goods or services or to an entire transaction amount.

16. The system of claim 13 wherein the point of sale is selected from the group consisting of: a point of sale terminal, a merchant location, a merchant group, a subset of point of sale terminals at a merchant, a merchant gateway, a computer, a digital storefront, an application or software running on a user computing device or mobile device, and a terminal located remotely from a customer managed by an operator.

17. The system of claim 13 wherein:
the database further comprises additional benefit criteria that may be applicable to the customer, merchant, transaction, goods or service, geographic location, total purchase amount, or customer membership in additional programs; and
wherein the processor determines whether the additional benefit criteria has been met in determining the transaction benefit amount.

18. The system of claim 13, wherein the identifiers of goods or service may comprise stock keeping units (SKUs) or universal price codes (UPCs).

19. The system of claim 13, wherein the identifiers of goods or services identifies a type of good or service identified in a transaction, and not individually delineate each good or service purchased.

20. The system of claim 19, wherein the identifiers may comprise a merchant category code (MCC), a standard industry classification (SIC) code, a North American Industry Classification System (NAICS) code, or a Global Industry Classification Standard (GICS) code.

21. A method for using a membership card to obtain benefits in a purchase transaction for goods or services at a merchant, the membership card not being associated with stored value and comprising an indicia printed or otherwise recorded thereon, the method comprising:
receiving at a central processor a communication from a point of sale over a credit or debit network, the communication comprising:
one or more identifiers of goods or services selected in the purchase transaction; and
information identifying the membership card, comprising at least a portion of the indicia;
determining by the central processor potential benefits, if any, associated with the membership card, such determination based at least in part upon communicating with a database, the database including one or more records potential benefits associated with the membership card;
determining by the central processor benefit criteria that must be met in order for the transaction to be eligible for benefits;
determining if the benefit criteria has been met, and if so, determining a transaction benefit amount applicable to the transaction;
sending to the point of sale at least in part over a credit or debit network a partial authorization in the amount of the transaction benefit amount.

* * * * *